United States Patent
Davis

(10) Patent No.: US 8,020,681 B2
(45) Date of Patent: *Sep. 20, 2011

(54) WEDGE ONE-WAY CLUTCH

(75) Inventor: Michael Davis, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 667 days.

This patent is subject to a terminal disclaimer.

(21) Appl. No.: 11/897,402

(22) Filed: Aug. 30, 2007

(65) Prior Publication Data

US 2008/0053784 A1 Mar. 6, 2008

Related U.S. Application Data

(60) Provisional application No. 60/842,070, filed on Sep. 1, 2006.

(51) Int. Cl.
*F16D 41/063* (2006.01)

(52) U.S. Cl. ........... 192/45.1; 188/82.8; 192/41 R

(58) Field of Classification Search .......... 60/345
See application file for complete search history.

(56) References Cited

U.S. PATENT DOCUMENTS

| | | | |
|---|---|---|---|
| 3,107,764 A * | 10/1963 | Fulton | 192/41 R |
| 4,867,641 A | 9/1989 | Okuno et al. | |
| 5,388,678 A | 2/1995 | Murata | |
| 6,612,107 B2 * | 9/2003 | Sato | 60/345 |
| 6,757,975 B1 * | 7/2004 | Todd et al. | 29/893.33 |
| 6,953,112 B2 | 10/2005 | Miura | |
| 7,040,469 B2 | 5/2006 | Shirataki et al. | |
| 2003/0146063 A1 * | 8/2003 | Yamada et al. | 192/46 |
| 2004/0112699 A1 | 6/2004 | Prater et al. | |
| 2004/0139743 A1 * | 7/2004 | Sato | 60/345 |
| 2007/0048082 A1 | 3/2007 | Hoffmann et al. | |
| 2007/0224046 A1 | 9/2007 | Wang et al. | |
| 2008/0149447 A1 * | 6/2008 | Davis | 192/45.1 |

FOREIGN PATENT DOCUMENTS

DE 19755168 6/1999

* cited by examiner

*Primary Examiner* — Rodney H Bonck
(74) *Attorney, Agent, or Firm* — Simpson & Simpson, PLLC

(57) ABSTRACT

The present invention broadly comprises a one-way clutch, including inner and outer races and a clutch element. The outer race is arranged for rotational connection to a torque transmitting element and rotates independently of the inner race for relative rotation in a first direction. The clutch element is connected to the outer race and includes at least one engagement element radially disposed between the races. The element is biased radially inward and arranged to rotationally lock the races in response to rotation in a second direction. The present invention also broadly comprises a one-way clutch with inner and outer races, at least one engagement element, and at least one elastically deformable element. One of the races is arranged for connection to a torque transmitting element. The engagement element is radially disposed between the races and is radially asymmetrical. The deformable element biases the engagement element in a rotational direction.

19 Claims, 15 Drawing Sheets

US 8,020,681 B2

WEDGE ONE-WAY CLUTCH

CROSS-REFERENCE TO RELATED APPLICATIONS

This application claims the benefit under 35 U.S.C. §119 (e) of U.S. Provisional Application No. 60/842,070 filed Sep. 1, 2006.

FIELD OF THE INVENTION

The invention relates to improvements in apparatus for transmitting force. The force can be between a rotary driving unit (such as the engine of a motor vehicle) and a rotary driven unit (such as the variable-speed transmission in the motor vehicle), or the force can be transmitted within a rotary driving unit (such as the transmission of a motor vehicle). In particular, the invention relates to a wedge one-way clutch with radially displacing locking elements and a wedge one-way clutch with circumferentially displacing locking elements.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2, This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

The use of roller clutches, such as clutch 46, also results in high stress due to the limited contact between the rollers in the clutch and the components radially bracketing the rollers. Therefore, the axial length of a roller clutch must be increased, undesirably increasing the axial space required for a component housing a roller clutch, for example, stator 39. U.S. Pat. No. 7,040,469 (Shirataki et al.) attempts to address stresses on retainers for roller clutches, but does not address the problem of reducing the axial length of the rollers. Sprag one-way clutches also suffer a similar undesirable increase in axial length for similar reasons. U.S. Pat. No. 6,953,112 (Miura) addresses problems associated with asymmetry of a frame for a sprag clutch, but does not address the problem of reducing the axial length of the clutch. Thus, roller and sprag one-way clutches, such as clutch 46, increases the cost, weight, and complexity of stator 39, and subsequently, of torque converter 10. It should be understood that the preceding discussion regarding one-way clutches is applicable to applications other than a torque converter.

Thus, there is a long-felt need for a one-way clutch providing a better distribution of stress forces and having a reduced axial length.

BRIEF SUMMARY OF THE INVENTION

The present invention broadly comprises a one-way clutch, including an inner race, an outer race, and a clutch element. The outer race is arranged for rotational connection to a torque transmitting element in an automotive device and arranged to rotate independently of the inner race for rotation, with respect to the inner race, in a first rotational direction. The clutch element is connected to the outer race and includes at least one engagement element radially disposed between the inner and outer races. The at least one engagement element is biased radially inward and is arranged to rotationally lock the first and second races in response to rotation of the outer race, with respect to the inner race, in a second rotational direction. In some aspects, the at least one engagement element is circumferentially tapered in the first rotational direction, In some aspects, the at least one engagement element includes an outer circumferential edge in contact with the outer race in the locking mode and a radial cross-section of the at least one engagement element is asymmetrical with respect a radius passing through a midpoint of the outer circumferential edge. In some aspects, a first area of the at least one engagement element is arranged to contact the inner race to rotationally lock the inner and outer races and a circumferential extent of the first area is greater than an axial extent of the first area. In some aspects, a second area of the at least one engagement element is arranged to contact the outer race to rotationally lock the inner and outer races and a circumferential extent of the second area is greater than an axial extent of the second area.

In some aspects, the clutch element includes at least one elastically deformable segment having a first end radially fixed and a second end connected to the at least one engagement element. The at least one elastically deformable segment is arranged to urge the at least one engagement element radially inward. In some aspects, the outer race is arranged to rotationally displace a predetermined circumferential distance with respect to the clutch element in the first direction to reduce contact force between the at least one engagement element and the inner and outer races. In some aspects, the clutch element includes at least one opening and the clutch includes at least one fastener connected to the outer race and extending through the at least one opening. In some aspects, the at least one engagement element is biased radially inward to offset centrifugal force associated with rotation in the second direction or to provide drag force for the locking in the second direction. In some aspects, the outer circumferential surface of the inner race includes a plurality of flat segments or the outer circumferential surface of the inner race forms a polygon for a radial cross-section of the inner race.

The present invention also broadly comprises a one-way clutch, including an inner race, an outer race, at least one engagement element, and at least one elastically deformable element. One of the inner or outer races is arranged for rotational connection to a torque transmitting element in an automotive device. The at least one engagement element is radially disposed between the inner and outer races and has an outer circumferential edge in contact with the outer race in a locking mode. The at least one elastically deformable element is arranged to bias the at least one engagement element in a first rotational direction and the at least one engagement element is arranged to rotationally lock the first and second races in a locking mode in response to rotation of the one of the inner or outer races, with respect to the other of the inner or outer races, in a second rotational direction. The one of the inner or outer races is arranged to rotate independently of the other of the inner or outer races for rotation, with respect to the other of the inner or outer races, in a third direction, opposite the second rotational direction. A radial cross-section of the at least one engagement element is asymmetrical with respect a radius passing through a midpoint of the portion of the outer circumferential edge of the at least one engagement element in contact with the outer race in the locking mode. In some aspects, the at least one engagement element is circumferentially tapered.

In some aspects, a first area of the at least one engagement element is arranged to contact the inner race to rotationally lock the inner and outer races and a circumferential extent of the first area is greater than an axial extent of the first area. In some aspects, a second area of the at least one engagement element is arranged to contact the outer race to rotationally lock the inner and outer races and a circumferential extent of the second area is greater than an axial extent of the second area. In some aspects, the inner race is arranged for rotational connection to the torque transmitting element and the first and second directions are a same direction. In some aspects, the outer race is arranged for rotational connection to the torque transmitting element and the first and third directions are a same direction.

The present invention further broadly comprises a one-way clutch, including an inner race, an outer race arranged for rotational connection to a torque transmitting element in an automotive device and arranged to rotate independently of the inner race for rotation, with respect to the inner race, in a first rotational direction, and at least one engagement element radially disposed between the inner and outer races, rotationally connected to the outer race, biased radially inward, and arranged to rotationally lock the first and second races in response to rotation of the outer race, with respect to the inner race, in a second rotational direction.

The present invention broadly comprises a one-way clutch, including an inner race, an outer race arranged for rotational connection to a torque transmitting element in an automotive device and arranged to rotate independently of the inner race for rotation, with respect to the inner race, in a first rotational direction, and at least one engagement element radially disposed between the inner and outer races, biased radially inward, and arranged to rotationally lock the first and second races in response to rotation of the outer race, with respect to the inner race, in a second rotational direction. A circumferential extent of a contact area between the at least one rotational element and at least one of the inner and outer races is greater than an axial extent of the contact area.

The present invention also broadly comprises a one-way clutch, including an inner race, an outer race, where one of the inner or outer races is arranged for rotational connection to a torque transmitting element in an automotive device, at least one engagement element radially disposed between the inner and outer races, and at least one elastically deformable element biasing the at least one engagement element in a first rotational direction. The at least one engagement element is arranged to rotationally lock the first and second races in response to rotation of the one of the inner or outer races, with respect to the other of the inner or outer races, in a second rotational direction. The one of the inner or outer races is arranged to rotate independent of the other of the inner or outer races for rotation of the one of the inner or outer races in a third rotational direction, with respect to the other of the inner or outer races, opposite the second rotational direction. An inner circumferential edge of the at least one engagement element is formed to compliment an outer circumferential edge of said inner race.

It is a general object of the present invention to provide a one-way clutch having a reduced axial width.

It is another object of the present invention to provide a modular one-way clutch.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
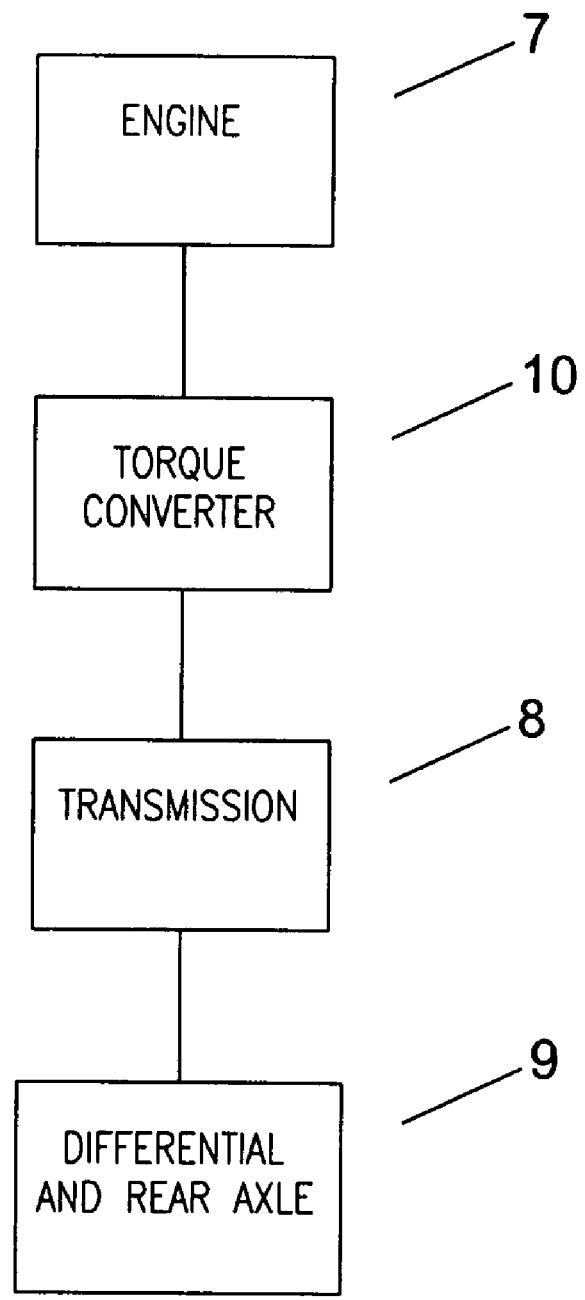
FIG. 1 is a general block diagram illustration of power flow in a motor vehicle, intended to help explain the relationship and function of a torque converter in the drive train thereof.
Figure 2:
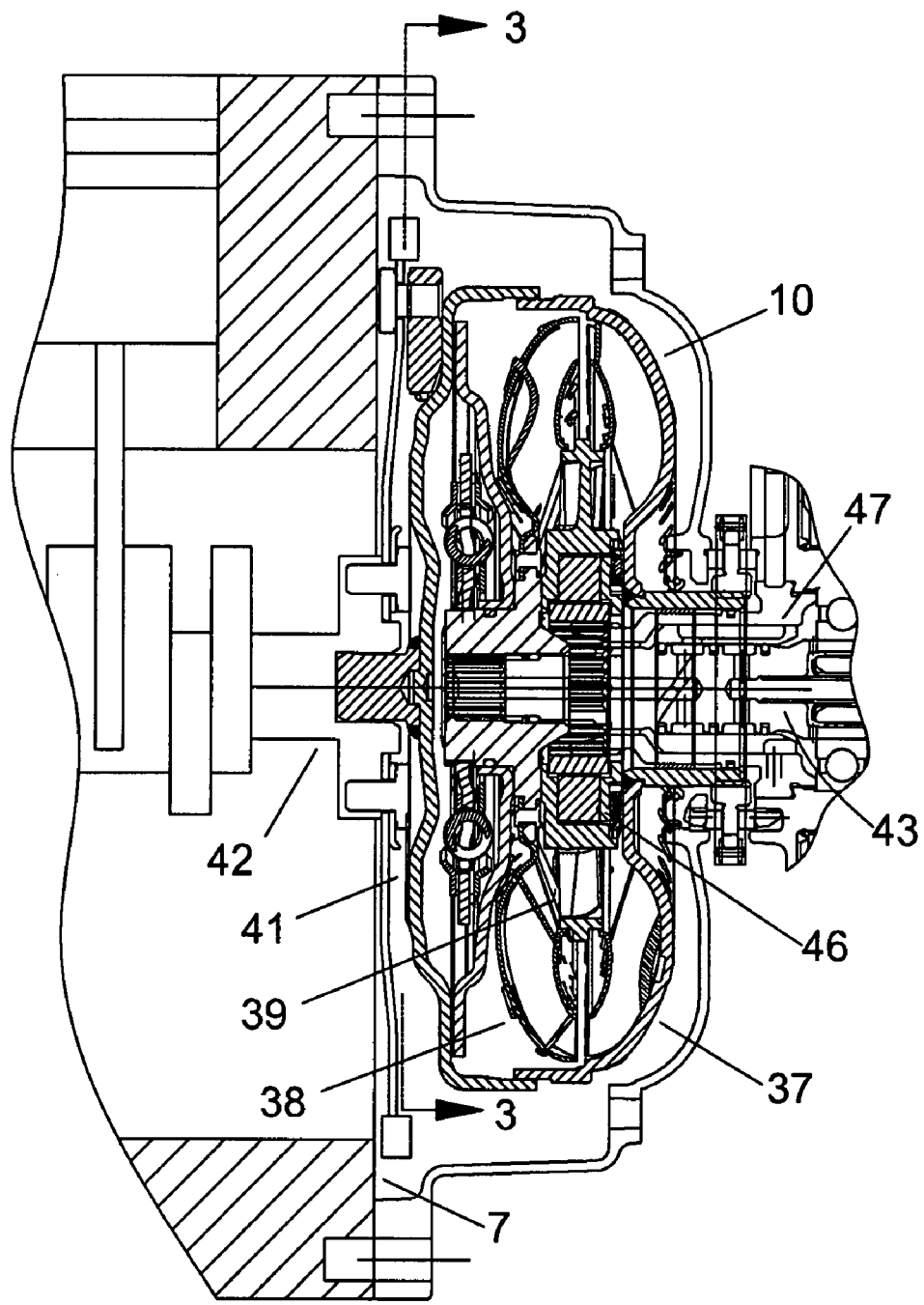
FIG. 2 is a cross-sectional view of a prior art torque converter, shown secured to an engine of a motor vehicle.
Figure 3:
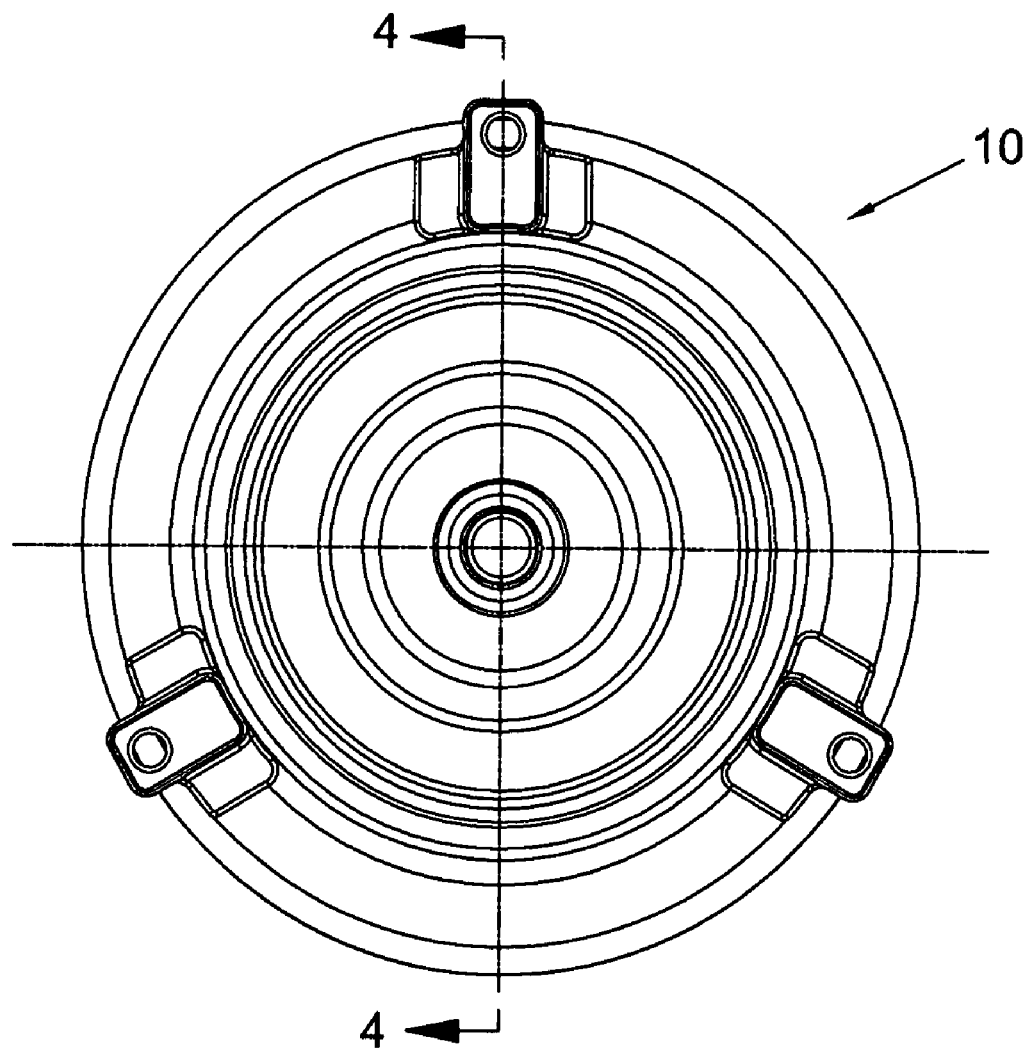
FIG. 3 is a left view of the torque converter shown in FIG. 2, taken generally along line 3-3 in FIG. 2.
Figure 4:
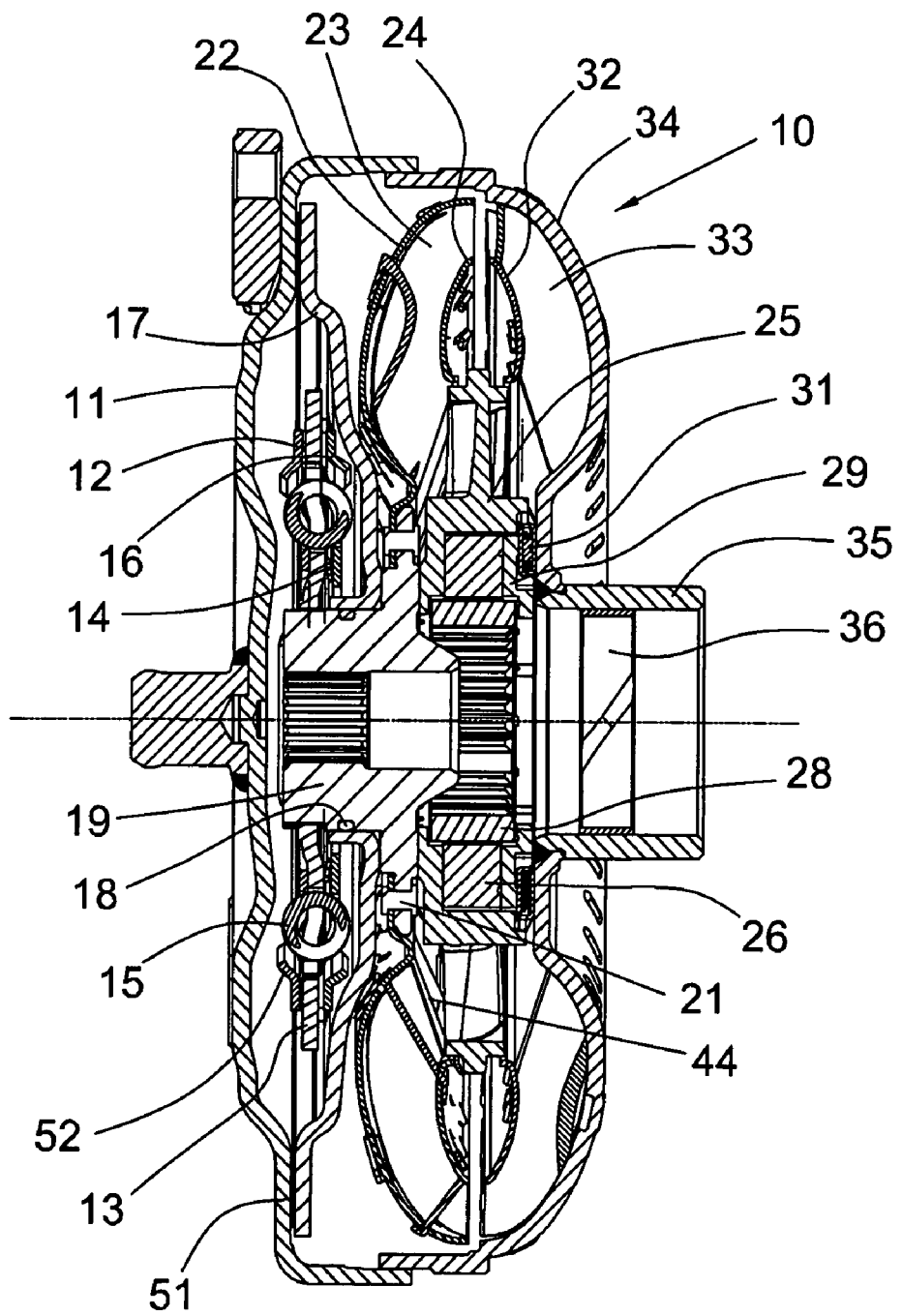
FIG. 4 is a cross-sectional view of the torque converter shown in FIGS. 2 and 3, taken generally along line 4-4 in FIG. 3.
Figure 5:
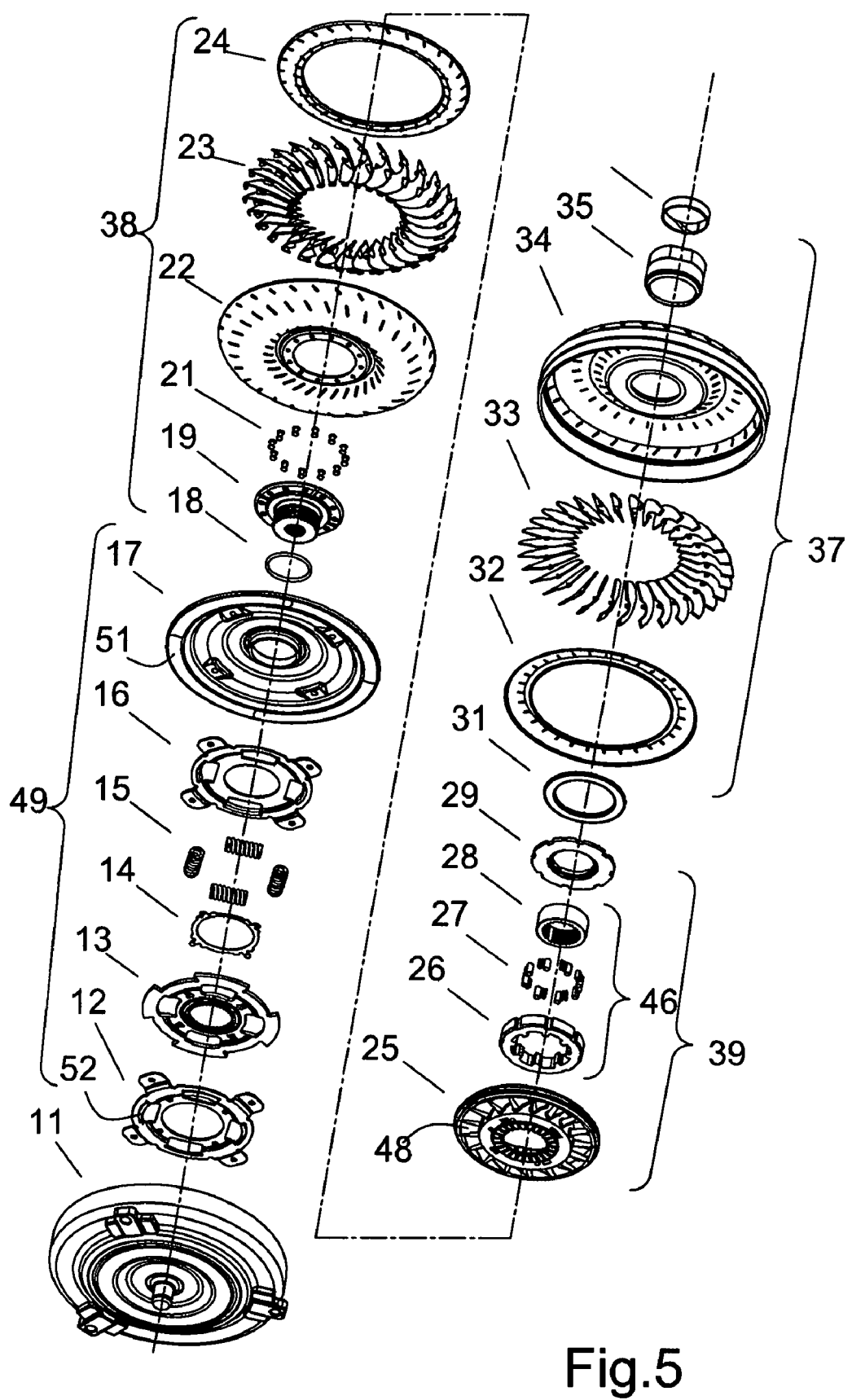
FIG. 5 is a first exploded view of the torque converter shown in FIG. 2, as shown from the perspective of one viewing the exploded torque converter from the left.
Figure 6:
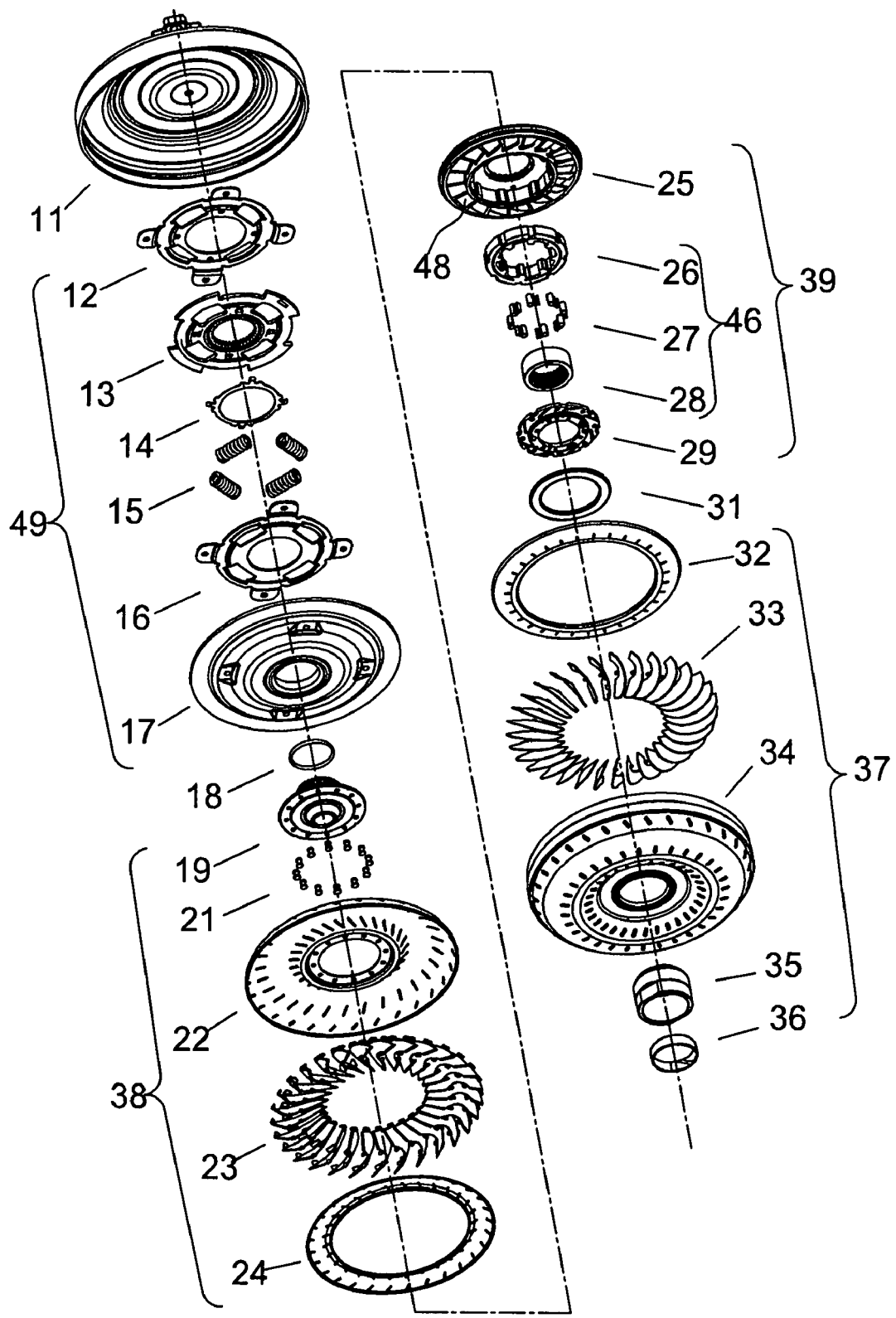
FIG. 6 is a second exploded view of the torque converter shown in FIG. 2, as shown from the perspective of one viewing the exploded torque converter from the right.
Figure 7A:
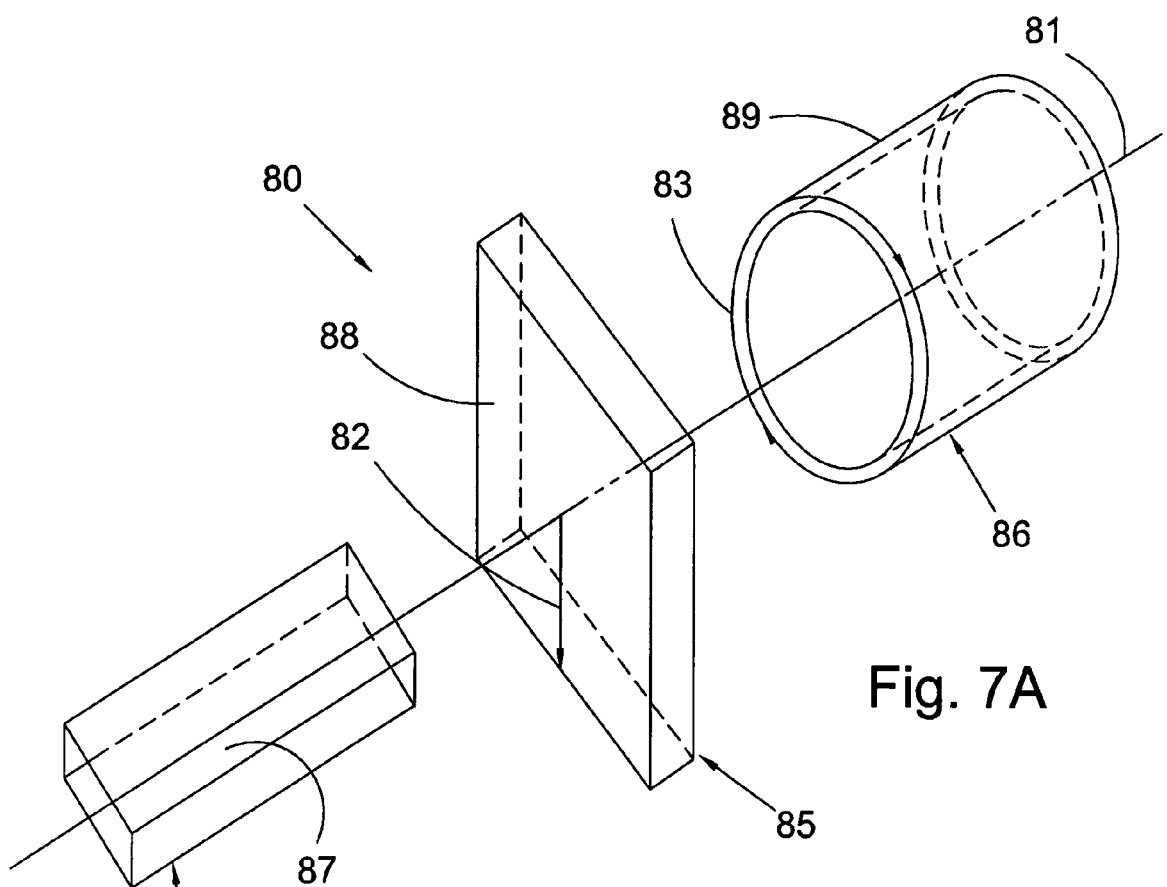
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), or circumference 83, respectively. The adjectives "axial," "radial" and "circumferential" refer to orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" refer to an orientation parallel to axis 81, radius 82, or circumference 83, respectively. The adverbs "axially," "radially," and "circumferentially" refer to an orientation parallel to respective planes.

Figure 7B:
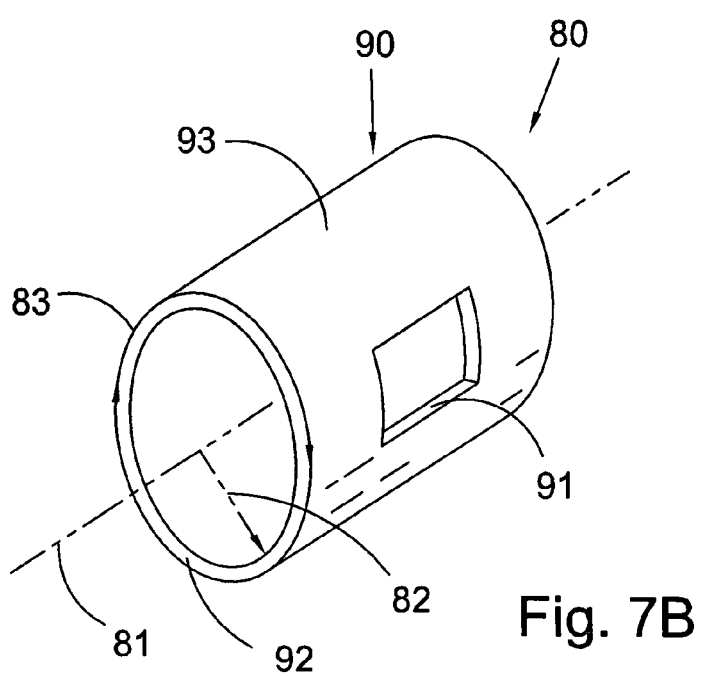
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
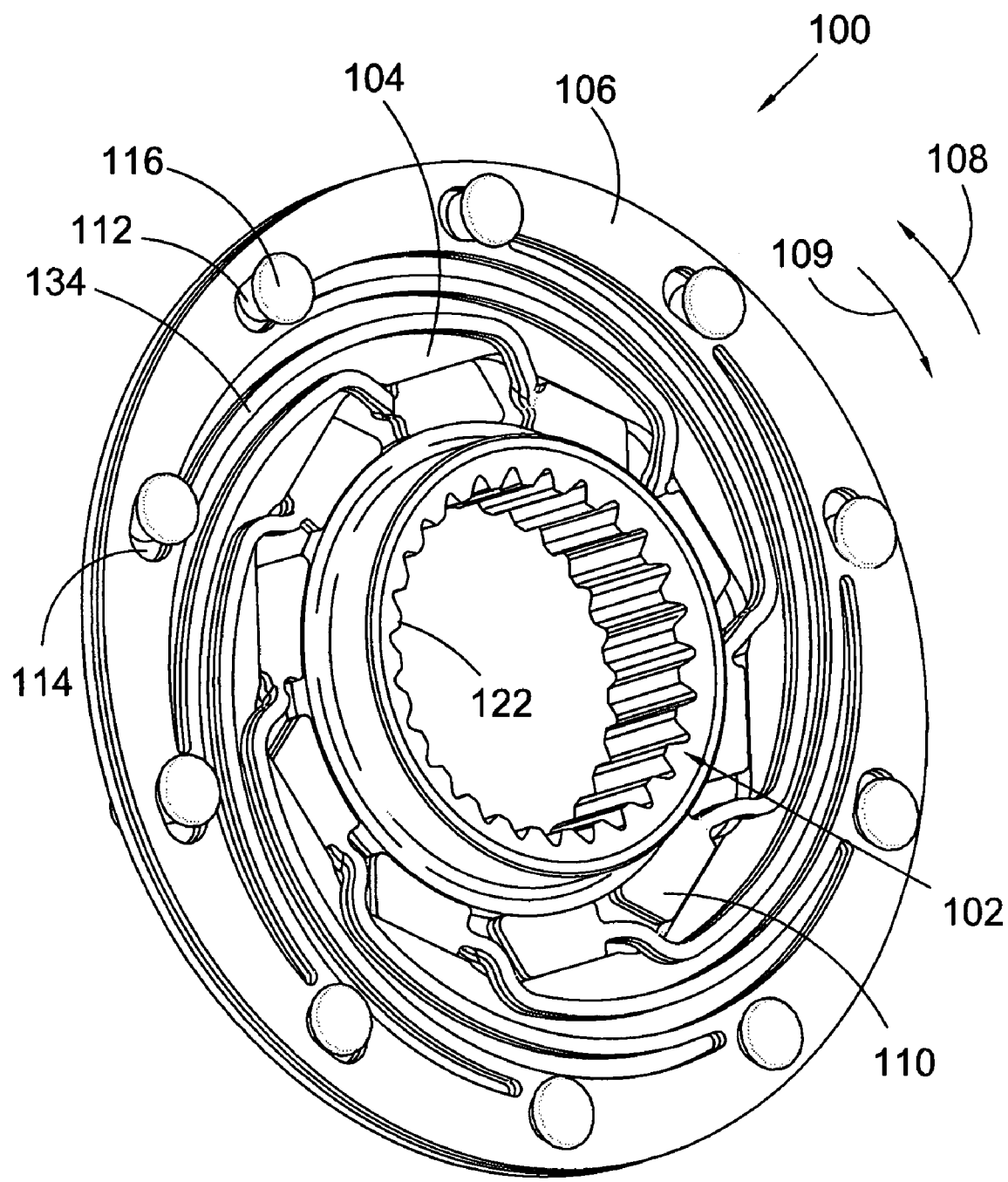
FIG. 8 is a perspective view of a present invention one-way clutch in a locking mode.

FIG. 8 is a perspective view of present invention one-way clutch 100.

Figure 9:
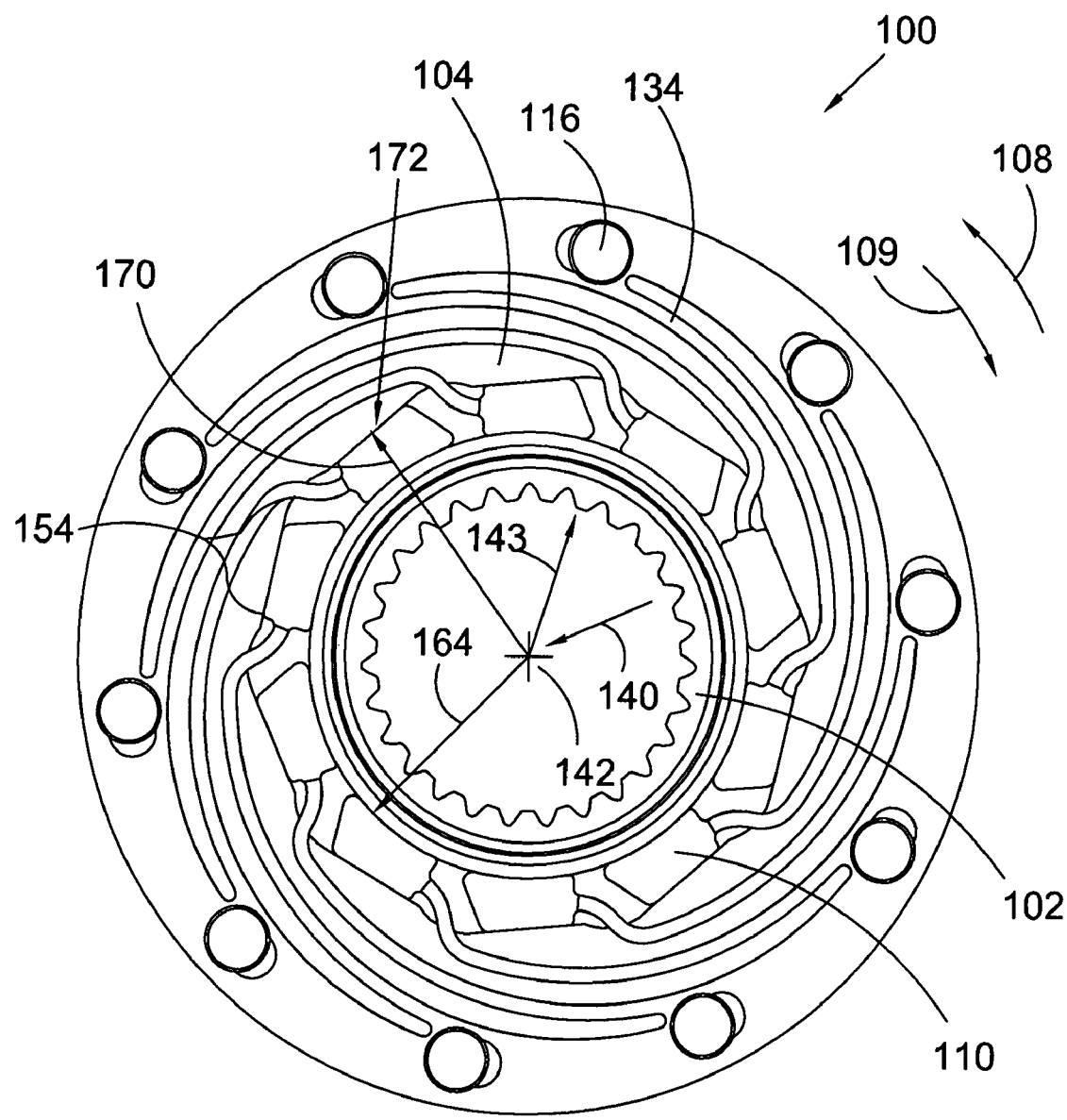
FIG. 9 is a front view of the clutch shown in FIG. 8.

FIG. 9 is a front view of clutch 100 in FIG. 8 in a locked mode.

Figure 10:
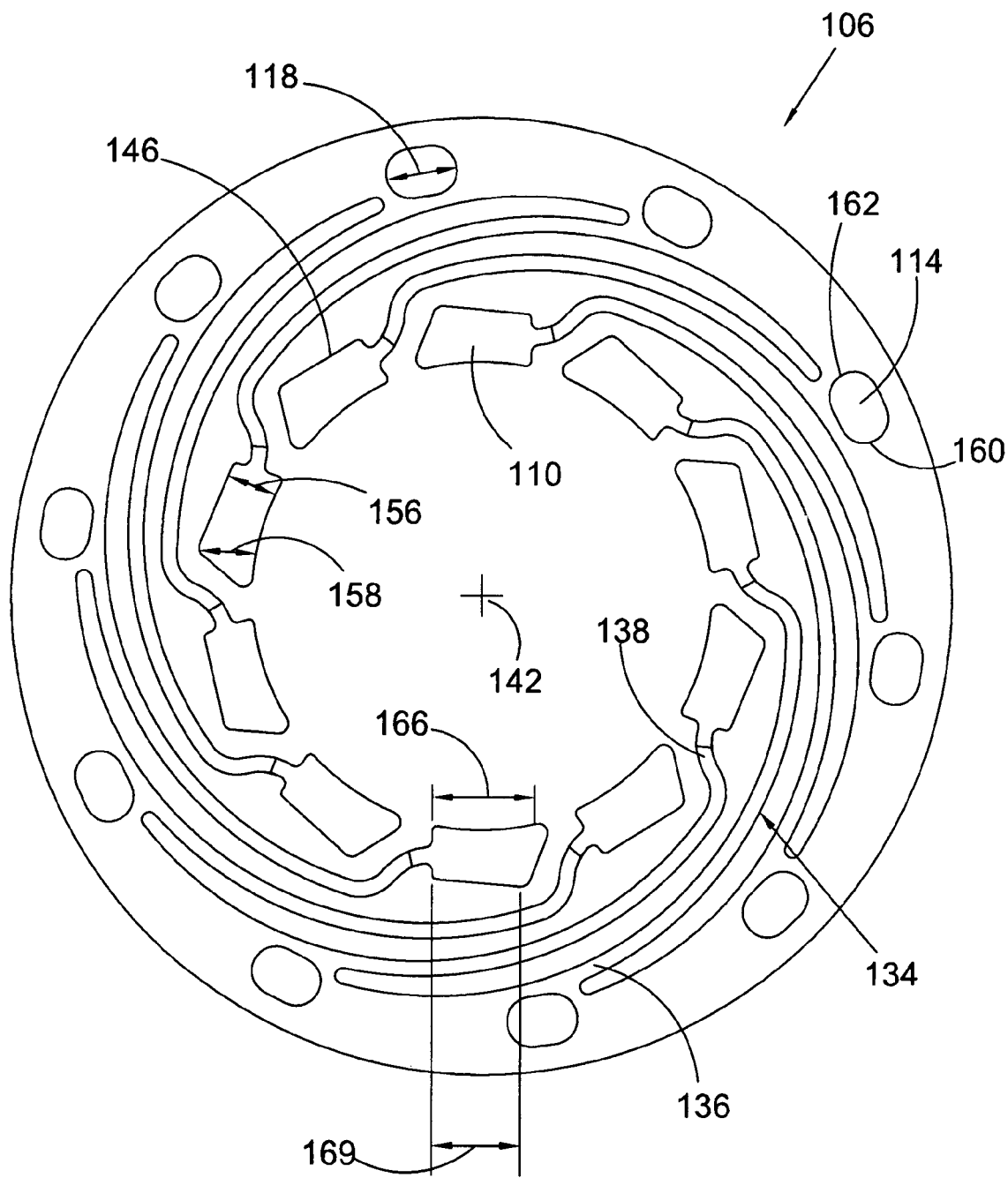
FIG. 10 is a front view of a clutch element shown in FIG. 8.

FIG. 10 is a front view of a clutch element shown in FIG. 8. The following should be viewed in light of FIGS. 8 through 10. One-way clutch 100 includes inner race 102, outer race 104, and clutch elements 106. The outer race is arranged for rotational connection to a torque transmitting element (not shown) in a automotive device (not shown) and is arranged to rotate independently of inner race 102 for rotation of the outer race, with respect to the inner race, in a free-wheel rotational direction, for example, as further explained below, for relative rotation in direction 108. The outer race is arranged to rotationally lock with the inner race for rotation of the outer race, with respect to the inner race, in a locking rotational direction, for example, as further explained below, for relative rotation in direction 109.

Elements 106 are connected to the outer race and include at least one engagement element 110 radially disposed between the inner and outer races and arranged to rotationally lock the inner and outer races in response to rotation in a locking rotational direction. For example, as noted above and further described below, elements 110 lock the inner and outer races for rotation of the outer race with respect to the inner race, in the locking direction. In the configuration shown in the figures, the free-wheel direction is direction 108 and the locking direction is direction 109. However, it should be understood that clutch 100 is not limited to this configuration, for example, in some aspects, the free-wheel and locking directions are reversed from those shown in the figures.

The clutch elements are at least partially rotationally connected to the outer race. By rotationally connected, or secured, we mean that the clutch elements and the outer race are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. By partially rotationally connected, we mean that a limited amount of rotational movement is enabled between the clutch elements and the outer race as further described below. Clutch elements 106 can be rotationally connected to the outer race by any means known in the art. In some aspects, fasteners 112 are used to connect clutch elements 106 with race 104. Fastener 112 can be any fastener known in the art, including, but not limited to discrete and extruded rivets. Then, elements 106 include openings 114 through which the fasteners pass. Fasteners 112 include protruding segment, or head, 116, which extends radially beyond openings 114 to axially secure race 104 and elements 106. In some aspects, length 118 of the openings is greater than a diameter of the fasteners and fastener 112 is arranged to enable the clutch elements to slide with respect to race 104, that is, partially rotate, as further explained below.

Figure 11:
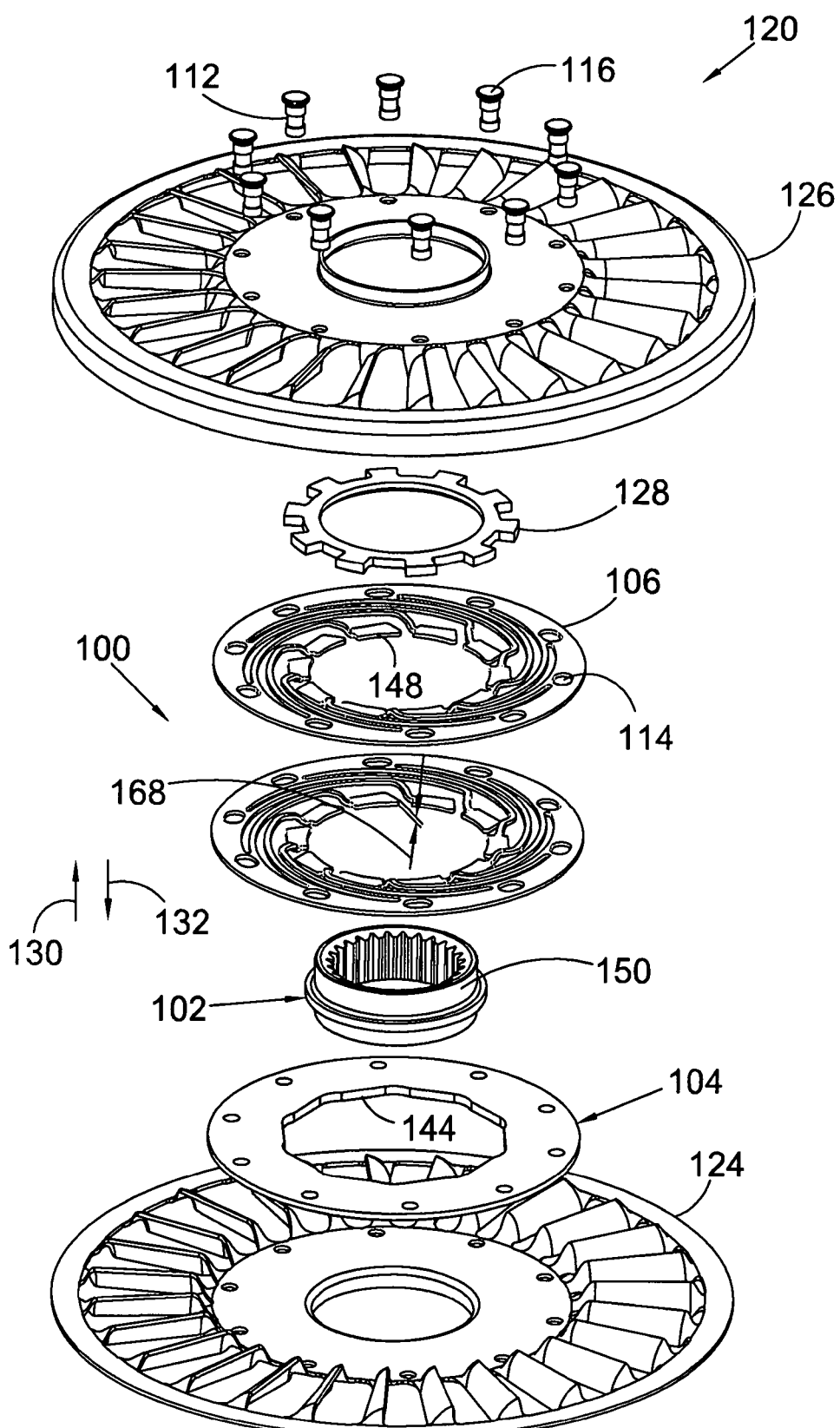
FIG. 11 is an exploded view of the clutch in FIG. 8 in a stator.

FIG. 11 is an exploded view of clutch 100 in FIG. 8 in a stator. The following should be viewed in light of FIGS. 8 through 11. In FIG. 11, clutch 100 is shown connected to a torque transmitting element in the form of torque converter stator 120. However, it should be understood that a present invention clutch is not limited to use with a torque converter stator and that a present convention clutch can be used with other torque transmitting elements in automotive devices. Race 102 is rotationally connected to a torque receiving using any means known in the art, for example, splines 122. For a torque converter stator, race 102 is connected to a fixed stator shaft, however, it should be understood that the inner race can be connected to a rotatable element. Race 104 is rotationally connected to the torque transmitting element by any means known in the art. In some aspects, fasteners 112 are used to connect race 104 with the torque transmitting element, for example, stator 120. Stator 120 includes blades segments 124 and 126 and side plate 128. Side plate 128 provides axial restraint for the clutch elements in direction 130 and outer race 104 provides axial restraint for the clutch elements in direction 132. Side plate 128 also carries the axial thrust load from blade 126 to the inner race and on to the blade 124, maintaining the axial spacing for elements 110, that is, preventing elements 110 from being axially impinged. It should be understood that a present invention one-way clutch is not limited to use with the configuration and construction of stator 120 and that the use of a present invention one-way clutch with other configurations and constructions is included within the spirit and scope of the claimed invention.

The operation of clutch 100 is now explained in further detail. In general, the change in position of elements 110 between the free-wheel and locking modes is relatively small. Therefore, FIG. 9 is used to show and describe both modes. Alternately stated, there is little movement of elements 110 between the free-wheel and locking modes. Thus, the amount of lash associated with a shift between modes is advantageously reduced.

Clutch element 106 includes elastically deformable segments 134 each having radially fixed end 136. For example, end 136 is connected to element 106, which is connected to the outer race, thereby radially fixing, or bracing, end 136. Segments 134 react against this bracing to bias elements 110. Element 106 also includes end 138 connected to a respective engagement element 110. In some aspects, segments 134 are integral to element 106 and in some aspects (not shown), segments 134 are separately formed and joined to element 106. Since element 106 is connected to a radial surface of the outer race, ends 138 are axially bent so that elements 110 are radially disposed between the races. Elastically deformable segments 134 are arranged to urge the engagement elements radially inward, for example, in direction 140 with respect to longitudinal axis 142. However, for rotation in direction 108, the centrifugal force (force in direction 143) overcomes the force applied by segments 134 and elements 110 lift off inner race 102 sufficiently to reduce frictional force between elements 110 and race 102, as further described.

In general, inner circumferential surfaces 144 of the outer race, outer circumferential surfaces 146 of elements 110, inner circumferential surfaces 148 of elements 110, and outer circumferential surface 150 of the inner race are shaped to enable free wheeling of race 104 in the free-wheel direction and locking of the inner and outer race in the locking direction. In general, the respective surfaces in contact are complimentarily formed. For example, in some aspects, surfaces 144 are made up of respective flat segments 154 and surfaces 146 also are flat, that is, non-arcuate in a circumferential direction, and surfaces 148 and 150 are curved.

Surfaces 144 and 146 are complimentarily formed to create a ramp configuration. In some aspects, engagement elements 110, in particular surfaces 146, are circumferentially tapered in rotational direction 108 and segments 154 are configured to complement the taper. For example, width 156 of elements 110 is less than width 158, both measured with respect to a radius of axis 142.

In the locking mode, surfaces 144 and 146 and surfaces 148 and 150 are wedged together due to the configuration of the respective surfaces (the locking mode is further described below). Openings 114 are configured to enable differential rotation, or the partial rotation noted above, between race 104 and clutch element 106 to further enable the transition from the locked mode to the free-wheel mode. Specifically, to shift to the free-wheel mode, outer race 104 begins to rotate in direction 108 from the position shown in FIG. 9. As the outer race begins to move, segments 134 hold respective elements 110 against the inner race. Fasteners 112 are located at end 160 of the openings. The diameter of the fasteners is less than length 118; therefore, the openings provide space for the fasteners (and outer race 104) to move in direction 108. The contact of elements 110 with the inner race rotationally fixes clutch element 106, enabling race 104 to rotate until fasteners 112 engage end 162 of openings 114.

The relative rotation of the outer race with respect to the clutch element enables segments 154 (surface 144) to slide with respect to surfaces 146. For example, the respective tapers of surfaces 144 and 146 form respective ramps, segments 154 slide on the ramps, and radial space is created between segments 154 and surfaces 146. When fasteners 112 reach end 162, the outer race and element 106 rotationally lock. As the outer race and element 106 gain speed, centrifugal force lifts the engagement elements off the inner race into the radial space noted above. Thus, inner race 102 and elements 110 rotate without contact or at least with greatly reduced frictional force.

To move from the free-wheel mode to the locking mode, race 104 begins to rotate in direction 109. Since the rotational velocity of race 104 drops to zero during the transition from the free-wheel mode to the locking mode, segments 134 hold elements 110 against the inner race, creating a drag force on elements 110. The drag forces causes clutch element 106 to rotationally lock with the inner race. However, since fasteners 112 are at end 162, outer race 104 is able to rotate, with respect to clutch element 106, in direction 109 until the fasteners contact end 160. The relative motion of race 104 with respect to elements 110 causes segments 154 to slide with respect to surfaces 146. That is, segments 154 ride on the respective ramps formed by surfaces 144 and 146 until races 102 and 104 are rotationally locked by the wedging of elements 110 between the races. In the locking mode, the portion of elements 110 in contact with the inner race, that is, surfaces 148 is at a uniform radial distance 164 from axis 142. Thus, in the transitions between the locking and free-wheel modes, race 104 rotates relative to clutch element 106 a predetermined circumferential distance (from end 160 to end 162) according to length 118 and the diameter of fasteners 112.

At least a portion of the respective areas, hereafter referred to as the contact areas, formed by surfaces 148 is in contact with surface 150 in the locking mode. For the discussion that follows, it is assumed that the full extent of respective surfaces 148 is in contact with surface 150. However, it should be understood that in some aspects (not shown), less than the full extent of surfaces 148 is in contact with surface 150. In some aspects, a circumferential extent of the contact area is greater than an axial extent of the contact area. For example, the length, or extent, of circumferential edge 166 is greater than the width, or extent, of axial edge 168. In like manner, a portion of respective surfaces 146 forms a contact area with surface 144 and the discussion regarding the contact area for surfaces 148 is generally applicable to surface 146. For example, in some aspects, a circumferential extent of the contact areas for surfaces 146 is greater than an axial extent of the contact areas. For example, the length, or extent, of circumferential edge 169 is greater than the extent of axial edge 168. Thus, since the configuration of elements 110 increase the circumferential extent of contact with the inner and outer races, the axial extent of elements 110 is reduced while maintaining the necessary load-bearing capacity for elements 110. Thus, the axial extent of clutch 100 is advantageously reduced.

In some aspects, a radial cross-section of respective engagement elements 110, for example, the view shown in the figures, is asymmetrical with respect a radius passing through a midpoint, or center, of the circumferential edge of respective elements 110 in contact with the outer race. For example, respective elements 110 are asymmetrical in a radial plane, or radial cross-section, with respect to radius 170 passing through center point, or midpoint, 172 of edges 169. Alternately stated, elements 110 are not axially-aligned cylinders and do not present a circular radial cross-section.

In some aspects, components of clutch 100 are formed by stamping. For example, outer race 104 and/or elements 106 can be formed by stamping.

Clutch 100 is shown with two clutch elements 106, however, it should be understood that clutch 100 is not limited to a specific number of clutch elements. For example, clutch 100 can have a single clutch element or more than two clutch elements. The number of clutch elements used can be determined according to the desired torque capacity of the automotive device using the clutch and manufacturing considerations, for example, selecting an optimal thickness of the clutch element with respect to a particular fabricating process. For example, in some aspects, the clutch elements are formed by stamping and the thickness of the clutch elements can be determined to accommodate the stamping equipment used. The design of clutch 100 and clutch elements 106 advantageously enhances the modularity of clutch 100. For example, starting with a "basic" configuration of inner and outer races, different numbers of clutch elements can be used according to the required torque capacity. Specifically, if the clutch is used in a torque converter stator, the number of clutch elements used in the clutch could be increased as the power of the engine for the vehicle housing the torque converter increases and vise versa. That is, the same basic clutch could be used for a wide range of vehicle engine sizes.

Figure 12A:
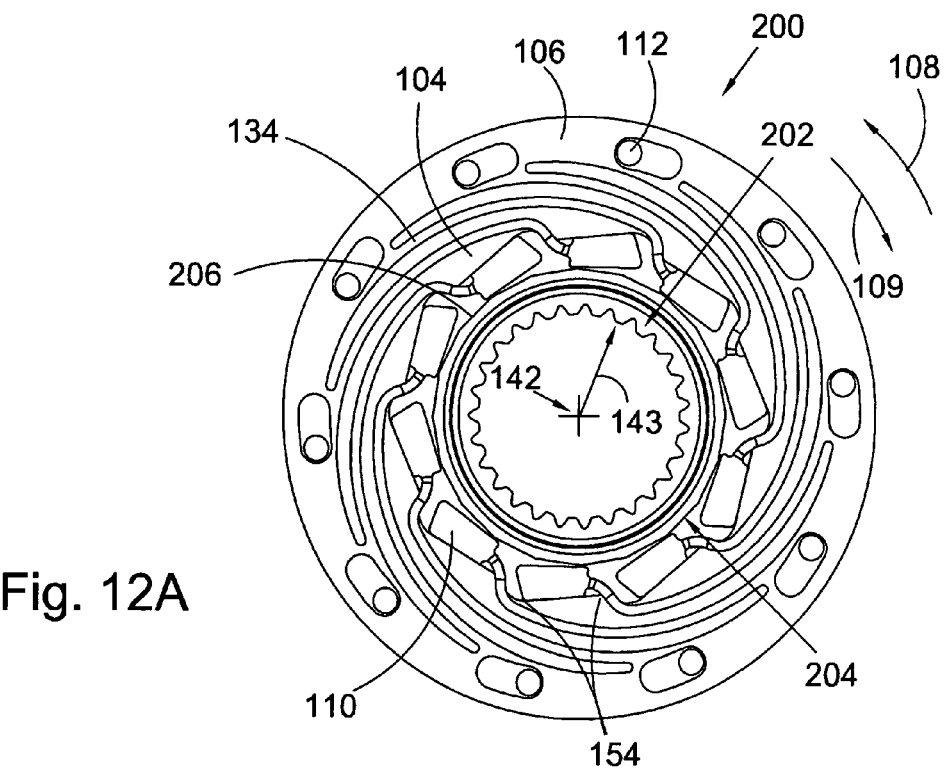
FIG. 12A is a front view of a present invention clutch with flat segments on the inner race in a free wheel mode.

FIG. 12A is a front view of present invention clutch 200 with flat engagement element surfaces in a free wheel mode.

Figure 12B:
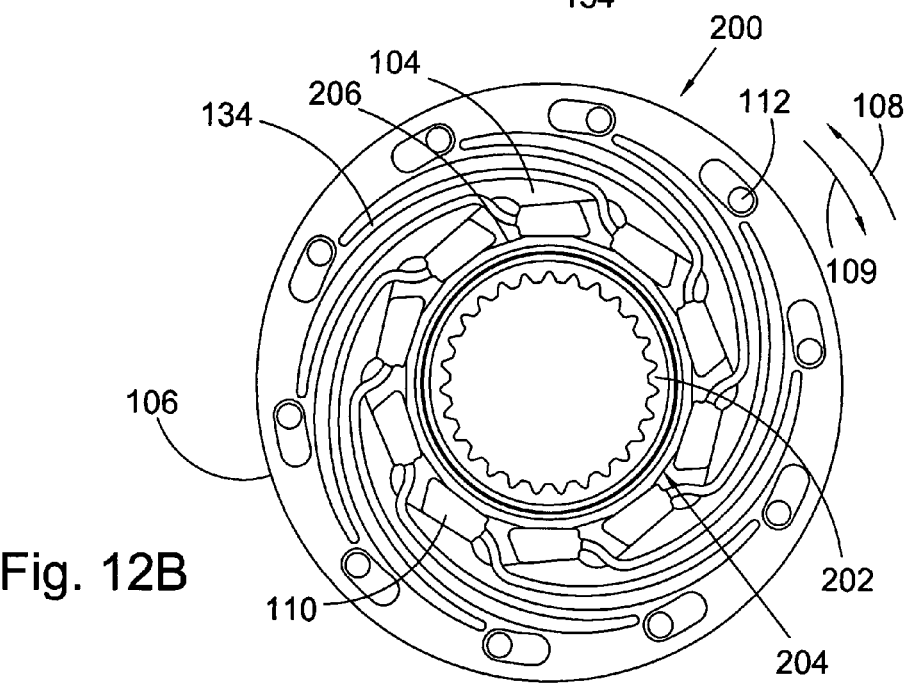
FIG. 12B is a front view of the clutch in FIG. 12A in a locking mode.

FIG. 12B is a front view of clutch 200 in FIG. 12B in a locking mode. The following should be viewed in light of FIGS. 8 through 12B. Clutch 200 is substantially the same as clutch 100 with the exception of the configuration of inner race 202. Therefore, the discussion regarding clutch 100 in the descriptions of FIGS. 8 through 11 is applicable to clutch 200, expect as noted. Specifically, outer circumferential surface 204 of race 202 includes flat sections 206 with which elements 110 engage. That is, rather than the outer circumference forming a circle in a radial cross-section, as shown for surface 150 of race 102, surface 204 forms a polygon in a radial cross-section. As shown in FIG. 12A, in the free-wheel mode, the configuration of sections 206 results in a greater separation of portions of elements 110 from the inner race.

Figure 13:
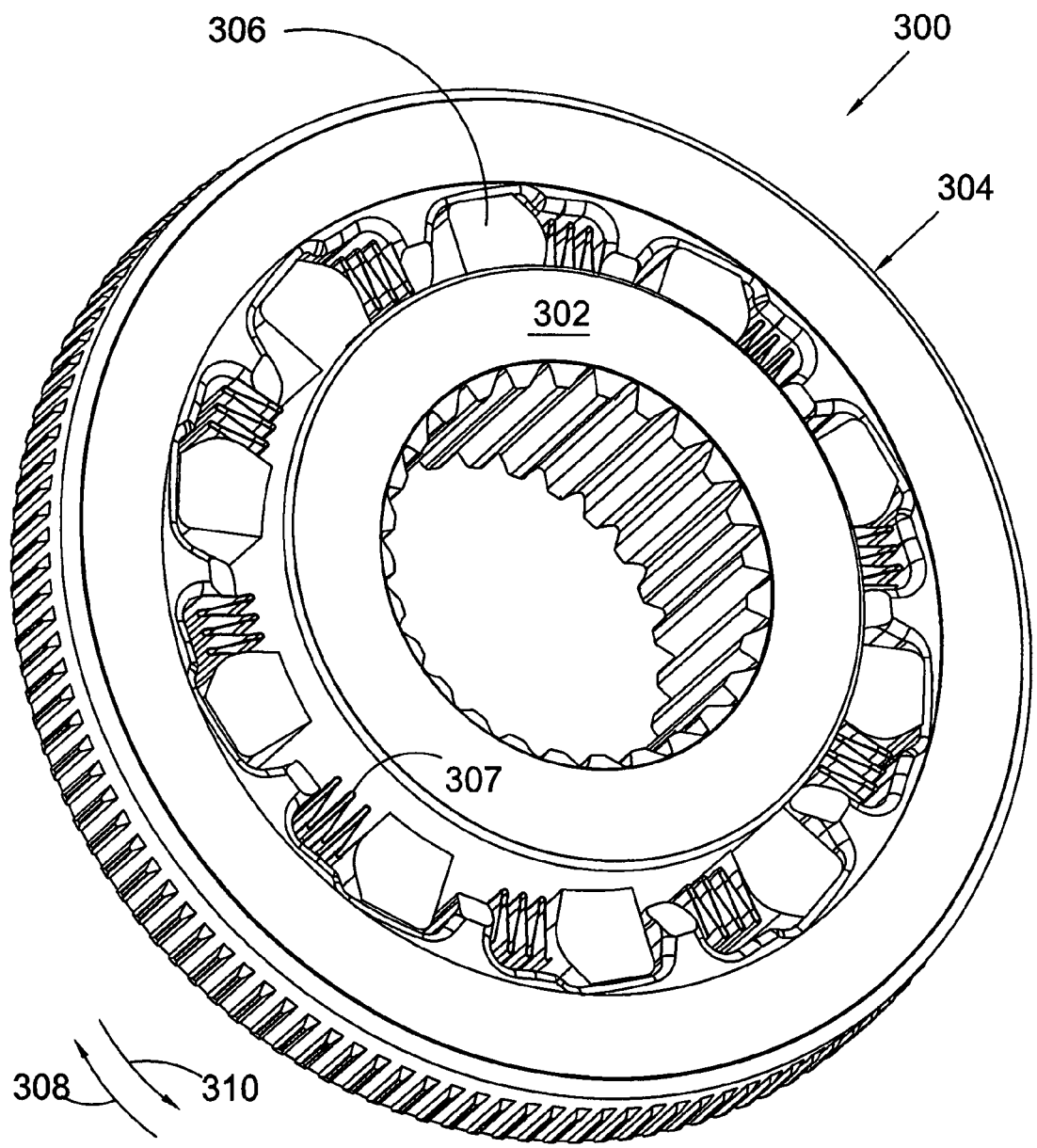
FIG. 13 is a perspective view of a present invention one-way clutch.

FIG. 13 is a perspective view of present invention one-way clutch 300.

Figure 14:
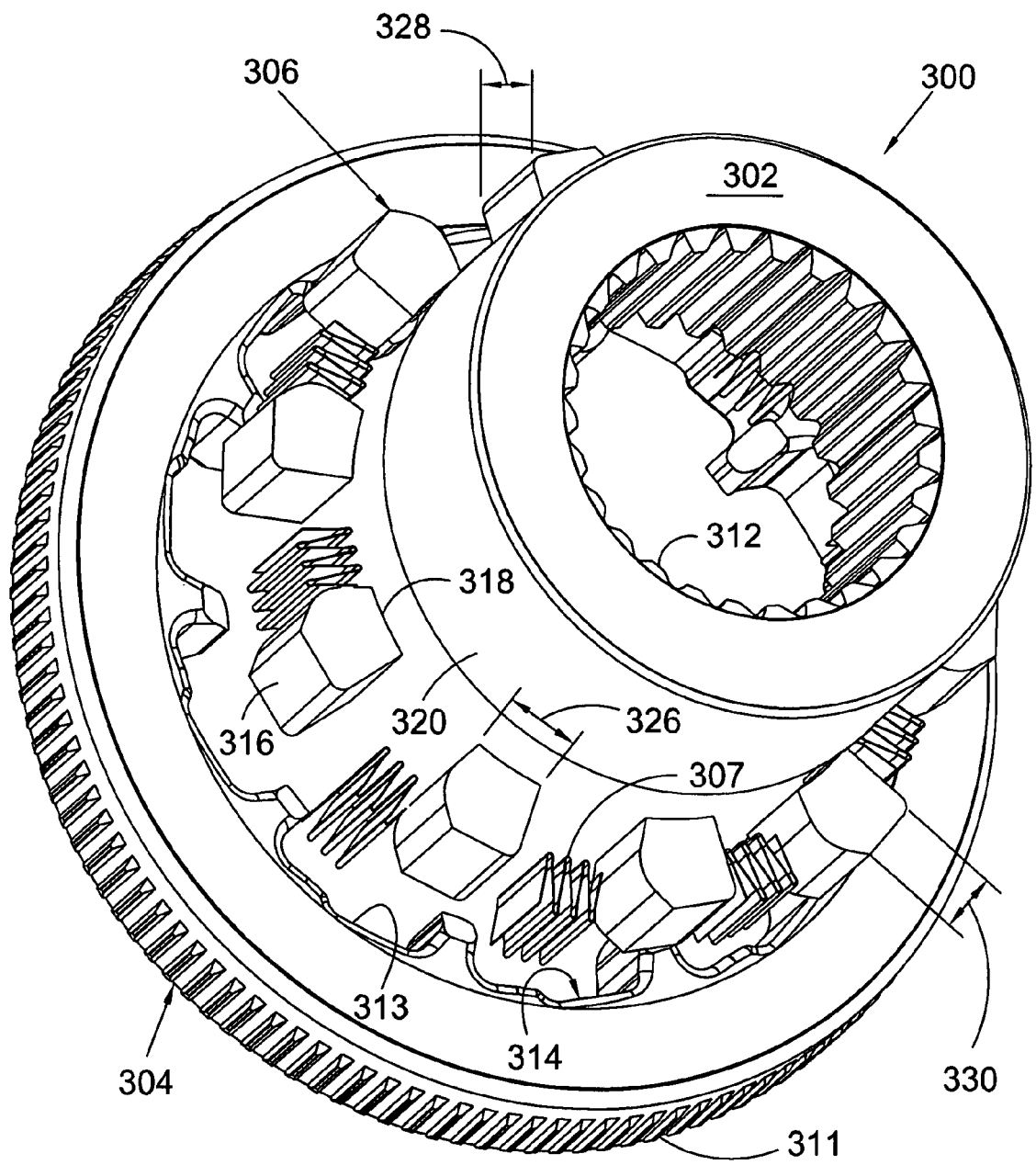
FIG. 14 is an exploded view of the clutch in FIG. 13.

FIG. 14 is an exploded view of clutch 300 in FIG. 13.

Figure 15:
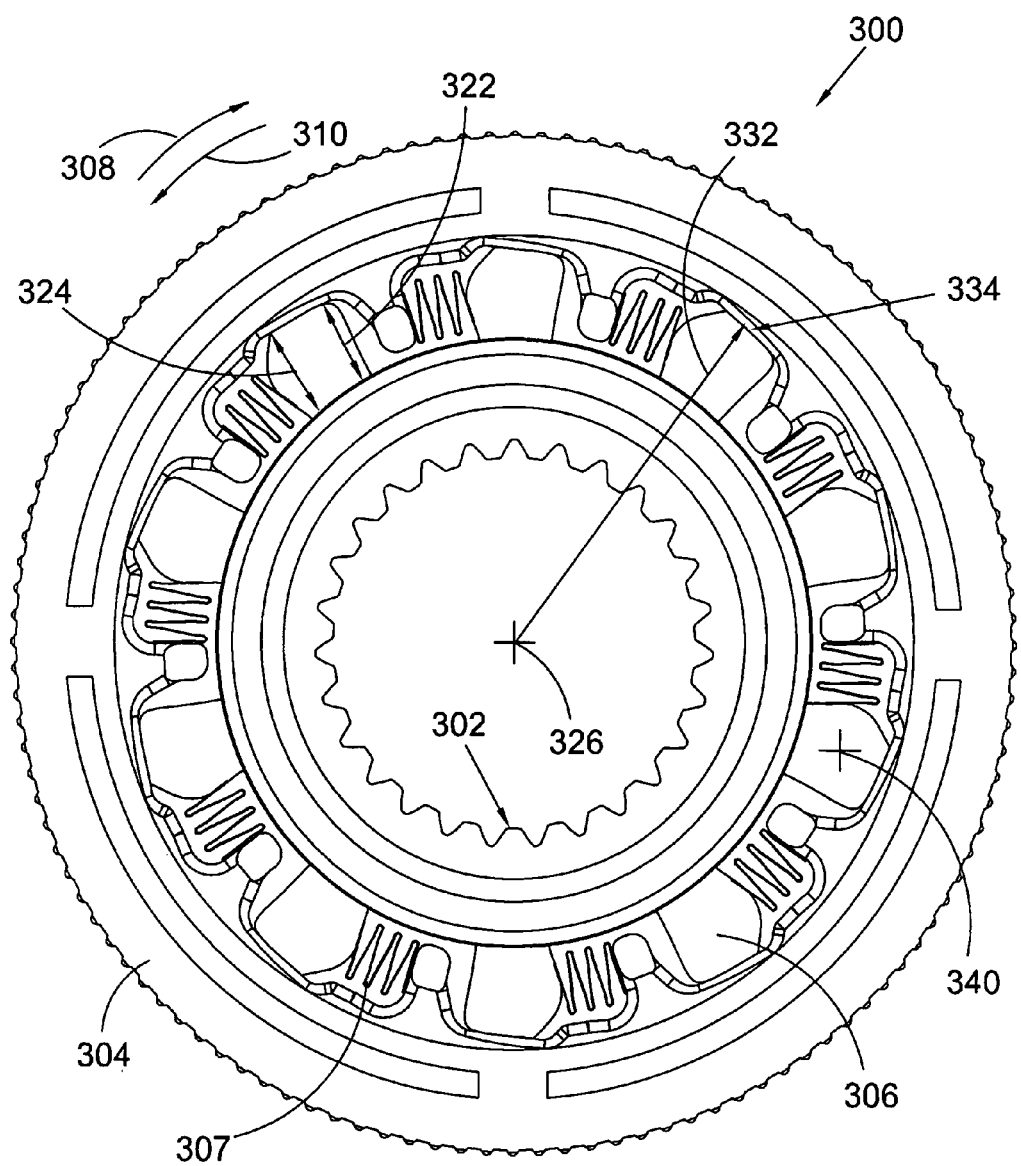
FIG. 15 is a front view of the clutch shown in FIG. 13.

FIG. 15 is a front view of clutch 300 shown in FIG. 13. The following should be viewed in light of FIGS. 13 through 15. Clutch 300 includes inner race 302, outer race 304, engagement elements 306, and elastically deformable elements 307. Elements 306 and 307 are radially disposed between the races. One of the inner or outer races is arranged for rotational connection to a torque transmitting element (not shown) in an automotive device (not shown) and is arranged to rotate independently of the other of the inner or outer races for rotation, with respect to the other of the inner or outer races, in a free-wheel rotational direction. The engagement elements are arranged to rotationally lock the inner and outer race in response to rotation in a locking rotational direction, opposite the free-wheel direction. Specifically, the engagement elements are arranged to rotationally lock the inner and outer race for rotation of the one of the inner or outer races connected to the torque transmitting element, with respect to the other of the inner or outer races, in the locking rotational direction. Elastically deformable elements 307 are arranged to bias, or urge, the engagement elements in a rotational direction.

In the description that follows, it is assumed that inner race 302 is rotationally fixed and outer race 304 is connected to the torque transmitting element. However, it should be understood that clutch 300 is not limited to this configuration. Further, in the configuration shown in the figures, the free-wheel direction is direction 308 and the locking direction is direction 310. In this configuration, deformable elements 307 bias elements 306 in the free wheel direction. However, it should be understood that clutch 300 is not limited to this configuration. For example, in some aspects, inner race 302 is connected to the torque transmitting element and outer race 304 is fixed. Then, the free-wheel and locking directions are directions 310 and 308, respectively, and deformable elements 307 bias elements 306 in the locking direction. Thus, the direction of the bias for elements 307, for example, in the free-wheel direction or in the locking direction, is at least determined by which of the races is connected to the torque transmitting element.

Race 304 can be rotationally connected to the torque transmitting element by any means known in the art. In some aspects, splines 311 are used. Race 302 can be rotationally fixed using any means known in the art, for example, splines 312.

The operation of clutch 300 is now explained in further detail. In general, the change in position of elements 306 between the free-wheel and locking modes is relatively small and a visual presentation of the difference is not necessary to understand the present invention. Therefore, FIGS. 13 through 15 are used to show and describe both modes. Alternately stated, there is little movement of elements 306 between the free-wheel and locking modes. Thus, the amount of lash associated with a shift between modes is advantageously reduced.

In general, segments 313 of inner circumferential surface 314 of the outer race, outer circumferential surfaces 316 of elements 306, inner circumferential surface 318 of elements 306, and outer circumferential surface 320 of the inner race are shaped to enable free wheeling of race 304 in the free-wheel direction and locking of the inner and outer race in the locking direction. In general, the respective surfaces in contact are complimentarily formed. For example, in some aspects, segments 313 and surfaces 316 are both flat, that is, non-arcuate in a circumferential direction and surfaces 318 and 320 are curved.

Surfaces 313 and 316 are complimentarily formed to create respective ramp configurations. In some aspects, engagement elements 306, in particular surfaces 316, are circumferentially tapered in rotational direction 308 and segments 313 are configured to complement the taper. For example, width 322 of elements 306 is less than width 324, both measured with respect to a radius of longitudinal axis 326.

In the locking mode, race 304 rotates in direction 310, surfaces 313 and 316 and surfaces 318 and 320 are wedged together due to the configuration of the respective surfaces (the locking mode is further described below). To move to the free-wheel mode, race 304 reverses to direction 308. The sloped configuration of surfaces 313 and 316 results in less frictional resistance than that presented by surfaces 318 and 320. As a result, surfaces 313 slide along surfaces 316 and race 304 moves in direction 308 with respect to race 302. The movement of race 304 creates sufficient radial space between elements 306 and the races to enable race 304 to continue to rotate (free-wheel) in direction 308. The increase in radial space decreases the frictional force between elements 306 and the inner race enabling elements 306 to rotate with the outer race. As the outer race gains speed, centrifugal force causes elements 306 to lift, reducing the drag between elements 306 and the inner race.

To move from the free-wheel mode to the locking mode, race 304 begins to rotate in direction 310. Elements 307 retard the relative movement of elements 306 in direction 310, causing surfaces 313 to slide over surfaces 316, which pushes elements 306 radially inward against inner race 302. As a result, elements 306 wedge between the races and the races are rotationally locked, in this case, rotationally fixed.

At least a portion of the areas, hereafter referred to as the contact areas, formed by respective surfaces 318 is in contact with surface 320 in the locking mode. For the discussion that follows, it is assumed that the full extent of surfaces 318 is in contact with surface 320. However, it should be understood that in some aspects (not shown), less than the full extent of surfaces 318 is in contact with surface 320. In some aspects, a circumferential extent of the contact area is greater than an axial extent of the contact area. For example, the length, or extent, of circumferential edges 326 is greater than the width, or extent, of axial edges 328. In like manner, a portion of respective surfaces 316 forms a contact area with surfaces 313 and the discussion regarding the contact area for surfaces 318 is generally applicable to surfaces 316. For example, in some aspects, a circumferential extent of the contact areas for surfaces 316 is greater than an axial extent of the contact areas. For example, the length, or extent, of circumferential edge 330 is greater than the extent of axial edge 328. Thus, since the configuration of elements 306 increase the circumferential extent of contact with the inner and outer races, the axial extent of elements 306 is reduced while maintaining the necessary load-bearing capacity for elements 306. Thus, the axial extent of clutch 300 is advantageously reduced.

In some aspects, a radial cross-section of respective engagement elements 306, for example, the view shown in the figures, is asymmetrical with respect a radius passing through a midpoint, or center, of the circumferential edge of respective elements 306 in contact with the outer race. For example, elements 306 are asymmetrical in a radial plane, or radial cross-section, with respect to radius 332 passing through center point, or midpoint, 334 of edge 330. Alternately stated, elements 306 are not axially-aligned cylinders and do not present a circular radial cross-section.

Engagement elements 306 are arranged to displace only in a circumferential direction or in a radial direction with respect to a longitudinal axis 326. For example, engagement elements 306 are arranged to displace only in directions 308 or 310, or parallel to a radius, such as radius 332, respectively. Engagement elements 306 include respective longitudinal axes 340 parallel to axis 326. Thus, elements 326 do not rotate about axes 340. In some aspects, there may be nominal movement of elements 306 parallel to axis 326.

The following should be viewed in light of FIGS. 8 through 15. In the descriptions of the figures above, one of the inner or outer races is fixed and the other of the races in rotatable. However, it should be understood that in a present invention one-way clutch, both the inner and outer races can be rotatable. For a clutch with both races rotatable, operation in the free-wheel and locking modes is with respect to relative motion of the races. For example, returning to FIG. 8, if races 102 and 104 are both rotatable and race 102 is rotating in direction 108, then clutch 100 operates in the free-wheel mode when race 104 rotates at a greater rate than race 102 in direction 108.

In some aspects, components of clutches 100, 200, or 300 are formed by stamping. For example, in some aspects, outer race 104 and/or elements 106 of clutch 100 are formed by stamping.

Although a present invention one-way clutch has been described in use with a torque converter stator, it should be understood that a present invention one-way clutch is not limited to use with a torque converter stator and that a present invention one-way clutch can be used with other automotive devices such as transmissions and power take-off units.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A one-way clutch, comprising:
    an inner race including a radially outwardly facing surface at a uniform radial distance from an axis of rotation for the one-way clutch;
    an outer race arranged for rotational connection to a torque transmitting element in an automotive device and arranged to rotate independently of said inner race for rotation, with respect to said inner race, in a first rotational direction;
    a clutch element:
        including an annular segment forming a continuous radially outer circumference of the clutch element;
        formed of a separate piece of material from the outer race and connected to said outer race at the annular segment; and,
        including a plurality of engagement elements radially disposed between said inner and outer races, wherein said plurality of engagement elements is biased radially inward and is arranged to rotationally lock said first and second races in response to rotation in a second rotational direction and wherein at least a portion of the annular segment is axially aligned with the outer race.

2. The one-way clutch of claim 1 wherein said at least one engagement element is circumferentially tapered in said first rotational direction.

3. The one-way clutch of claim 1 wherein said at least one engagement element comprises an outer circumferential edge in contact with said outer race in said locking mode and a radial cross-section of said at least one engagement element is asymmetrical with respect a radius passing through a midpoint of said outer circumferential edge.

4. The one-way clutch of claim 1 wherein a first area of said at least one engagement element is arranged to contact said inner race to rotationally lock said inner and outer races and a circumferential extent of said first area is greater than an axial extent of said first area.

5. The one-way clutch of claim 1 wherein a second area of said at least one engagement element is arranged to contact said outer race to rotationally lock said inner and outer races and a circumferential extent of said second area is greater than an axial extent of said second area.

6. The one-way clutch of claim 1 wherein said clutch element further comprises at least one elastically deformable segment having a first end radially fixed and a second end connected to said at least one engagement element, said least one elastically deformable segment arranged to urge said at least one engagement element radially inward.

7. The one-way clutch of claim 1 wherein said outer race is arranged to rotationally displace a predetermined circumferential distance with respect to said clutch element.

8. The one-way clutch of claim 7 wherein said outer race is arranged to rotationally displace a predetermined circumferential distance in said first direction to reduce contact force between said at least one engagement element and said inner and outer races.

9. The one-way clutch of claim 8 wherein said clutch element further comprises at least one opening and said clutch further comprising at least one fastener connected to said outer race and extending through said at least one opening.

10. The one-way clutch of claim 1 wherein said at least one engagement element is biased radially inward to offset centrifugal force associated with rotation in said second direction.

11. The one-way clutch of claim 1 wherein said at least one engagement element is biased radially inward to contact said inner race to provide drag force for said locking in said second direction.

12. The one-way clutch of claim 1 wherein an outer circumferential surface of said inner race further comprises a plurality of flat segments.

13. The one-way clutch of claim 12 wherein said outer circumferential surface of said inner race forms a polygon for a radial cross-section of said inner race.

14. A one-way clutch, comprising:
    an inner race including a radially outwardly facing surface at a uniform radial distance from an axis of rotation for the one-way clutch;
    an outer race including an inner circumference with a plurality of flat segments facing radially inward, wherein one of said inner and outer races is arranged for rotational connection to a torque transmitting element in an automotive device;

at least one engagement element radially disposed between said inner and outer races and having an outer circumferential edge in contact with said outer race in a locking mode;

at least one elastically deformable element biasing said at least one engagement element in a first rotational direction, wherein said at least one engagement element is arranged to rotationally lock said first and second races in said locking mode in response to rotation of said one of said inner and outer races, with respect to said other of said inner and outer races, in a second rotational direction, wherein said one of said inner and outer races is arranged to rotate independently of said other of said inner and outer races for rotation, with respect to said other of said inner and outer races, in a third direction, opposite said second rotational direction, and wherein a radial cross-section of said at least one engagement element is asymmetrical with respect a radius passing through a midpoint of said outer circumferential edge of at least one engagement element.

15. The one-way clutch of claim 14 wherein said at least one engagement element is circumferentially tapered.

16. The one-way clutch of claim 14 wherein a first area of said at least one engagement element is arranged to contact said inner race to rotationally lock said inner and outer races and a circumferential extent of said first area is greater than an axial extent of said first area.

17. The one-way clutch of claim 14 wherein a second area of said at least one engagement element is arranged to contact said outer race to rotationally lock said inner and outer races and a circumferential extent of said second area is greater than an axial extent of said second area.

18. The one-way clutch of claim 14 wherein said inner race is arranged for rotational connection to said torque transmitting element and said first and second directions are a same direction.

19. The one-way clutch of claim 14 wherein said outer race is arranged for rotational connection to said torque transmitting element and said first and third directions are a same direction.

* * * * *